Nov. 3, 1964 T. E. LOHR 3,155,363
SEAT ADJUSTER
Filed Oct. 2, 1961 3 Sheets-Sheet 1

INVENTOR.
*Thomas E. Lohr*
BY
*J. L. Carpenter*
ATTORNEY

INVENTOR.
Thomas E. Lohr
BY
J. L. Carpenter
ATTORNEY

Nov. 3, 1964 T. E. LOHR 3,155,363
SEAT ADJUSTER
Filed Oct. 2, 1961 3 Sheets-Sheet 3

INVENTOR.
Thomas E. Lohr
BY
J. L. Carpenter
ATTORNEY

United States Patent Office

3,155,363
Patented Nov. 3, 1964

3,155,363
SEAT ADJUSTER
Thomas E. Lohr, Detroit, Mich., assignor to General Motors Corporation, Detroit, Mich., a corporation of Delaware
Filed Oct. 2, 1961, Ser. No. 142,411
3 Claims. (Cl. 248—419)

This invention relates to a seat adjuster, and more particularly to a power six-way vehicle seat adjuster.

In conventional power actuated vehicle seat adjusters, a pair of spaced actuating units, which extend longitudinally of the vehicle, are utilized to raise and lower the seat to which they are connected and to move the seat fore and aft. Seat adjusting mechanisms which can move a seat fore and aft and uniformly vertically are commonly called four-way seat adjusters. Seat adjuster units which additionally provide for tilting of the seat unit by separate vertical movement at the front or rear of the seat are commonly called six-way seat adjusters. Conventional seat adjuster units commonly comprise, for horizontal adjustment, an upper track member which is fixedly secured to the seat frame and a lower track member which is slidably mounted relative thereto and fixedly secured relative to the vehicle floor. The vertical adjusting mechanism commonly takes the form of bell crank and lever means which are mounted either between the lower track member and the vehicle floor or the upper track member and the seat frame. In this manner, the conventional seat adjuster units comprise a series of support brackets, links and levers, and track means which are disposed in a vertically stacked relationship relative to one another beneath the seat frame. The seat adjusters are conventionally actuated by power means located on the vehicle floor beneath the seat and connected to the adjuster units through transmission means, flexible cables and adjuster actuating gear elements.

Current vehicle designs require that seat units be disposed as close to the vehicle floor as possible in order to provide sufficient head room for vehicle passengers. Consequently, efforts are being continually devoted to reducing the vertical space required by seat adjuster mechanisms so that the vehicle seat may be located in a lower position relative to the vehicle floor. It is, therefore, desirable to provide a seat adjuster mechanism which is compact and occupies a minimum amount of space beneath the vehicle seat. In addition the location of the seat adjuster actuating means on the vehicle floor beneath the vehicle seat is not entirely satisfactory in that articles stored under the seat, or debris collecting thereunder, are susceptible of becoming entangled with the actuating means. Further, the amount of storage space provided beneath the seat is materially reduced by the actuating mechanism located thereunder.

Accordingly, an object of this invention is to provide new and improved seat adjusting mechanism which enables a vehicle seat to be adjustably supported in a more satisfactory manner closer to a vehicle floor. Another object of the invention is to provide a new and improved seat adjuster arrangement whereby the adjuster actuating means can be located beneath the vehicle floor. Still another object of the present invention is to provide an improved design of seat adjuster mechanisms including new and improved horizontal actuating mechanisms and new and improved vertical actuating mechanisms. A general object of the invention is to provide a seat adjuster arrangement which is compact, requires a minimum amount of space beneath a vehicle seat; but provides a full range of seat adjustment. A more specific object of the invention is to combine the seat adjuster units with the seat frame in a new and improved manner to increase seat comfort by permitting full spring deflection of the seat over a wider range. Another specific object of the invention is to eliminate seat adjuster actuating mechanism noise within the passenger compartment.

Another specific object of this invention is to provide a variable counterbalancing means to assist the vertical actuating mechanisms.

An illustrative embodiment of apparatus embodying the principles of the present invention and providing new and improved advantages and results in accordance with the aforementioned objects, and others which hereinafter will be apparent to those skilled in the art, is hereinafter described in detail with reference to the accompanying drawing, wherein.

Figure 1:
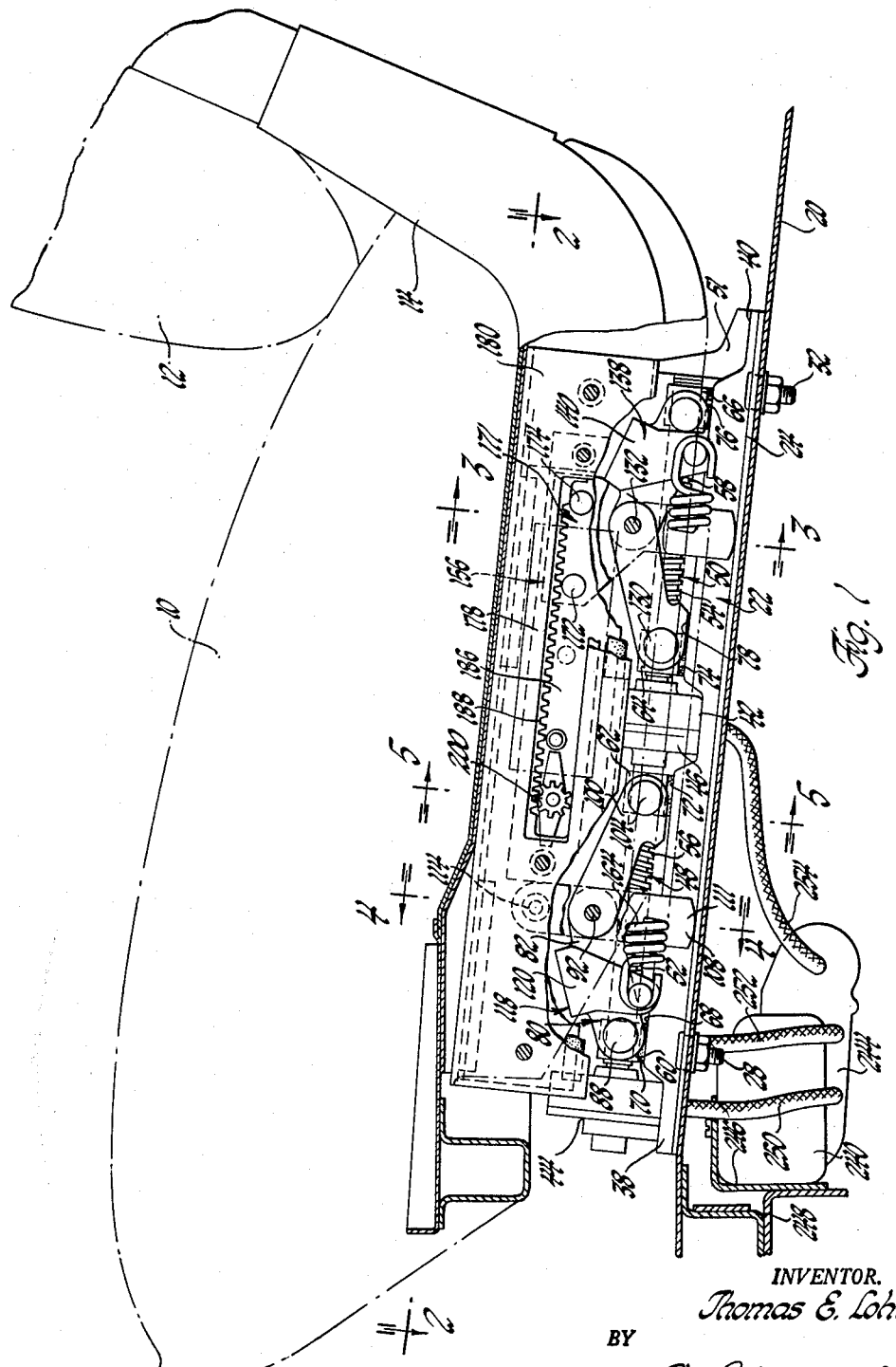
FIGURE 1 is a side elevational view, partly in section, of apparatus embodying the present invention.
Figure 2:
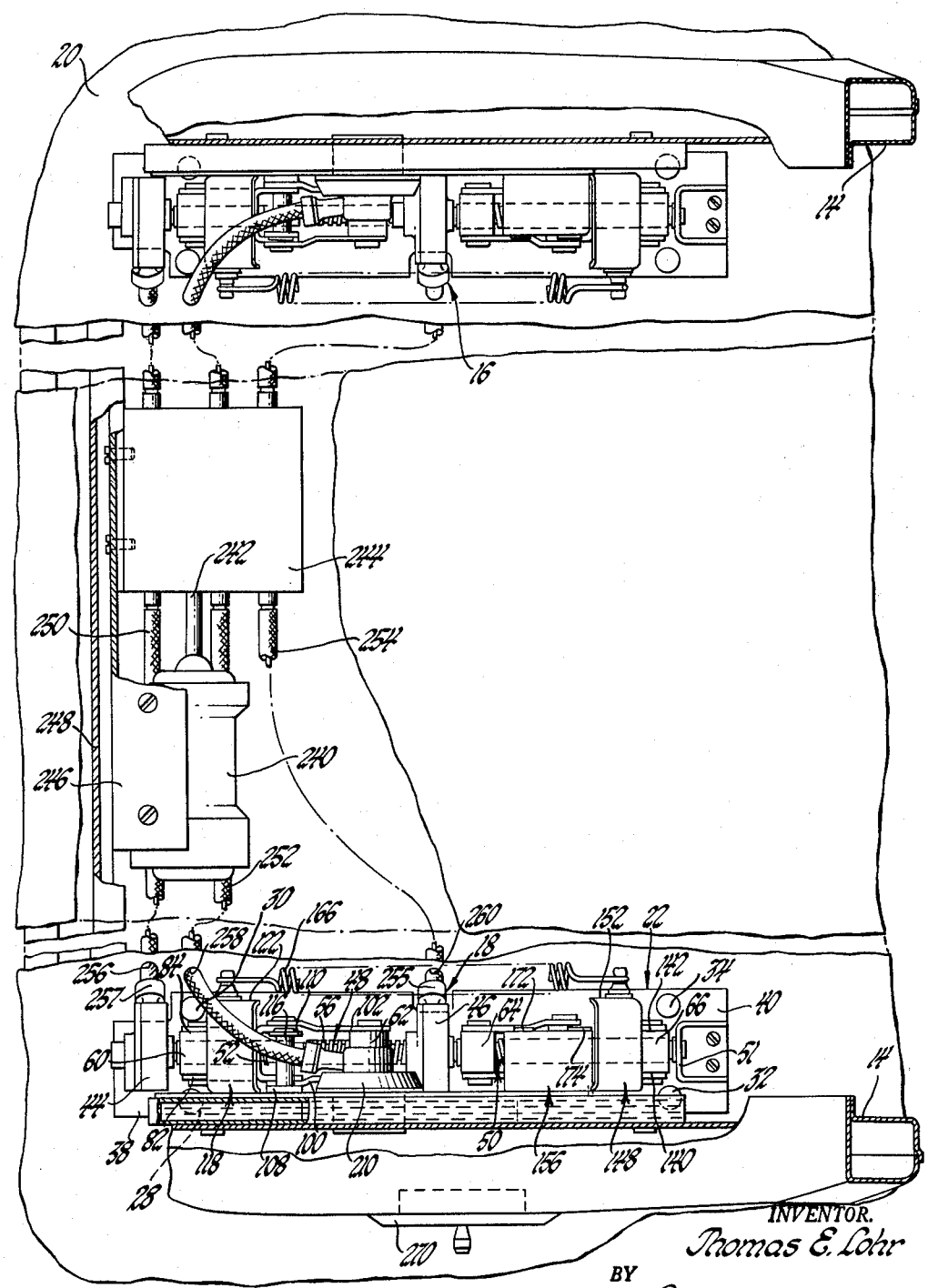
FIGURE 2 is a plan view, taken along the line 2—2 in FIGURE 1.

Referring now to the drawings, and particularly FIGURES 1 and 2, a vehicle seat cushion 10 and seat back cushion 12 are shown in assembled position on a seat frame 14. The seat frame 14 is supported in a vertically elevated position by a pair of spaced seat adjuster units 16, 18 which are fastened to the vehicle floor 20 in a conventional manner. Since the adjuster units 16, 18 are identical, only the adjuster unit 18 will be described in detail, it being understood that the adjuster unit 16 has corresponding similar parts which function in the same manner.

Figure 3:
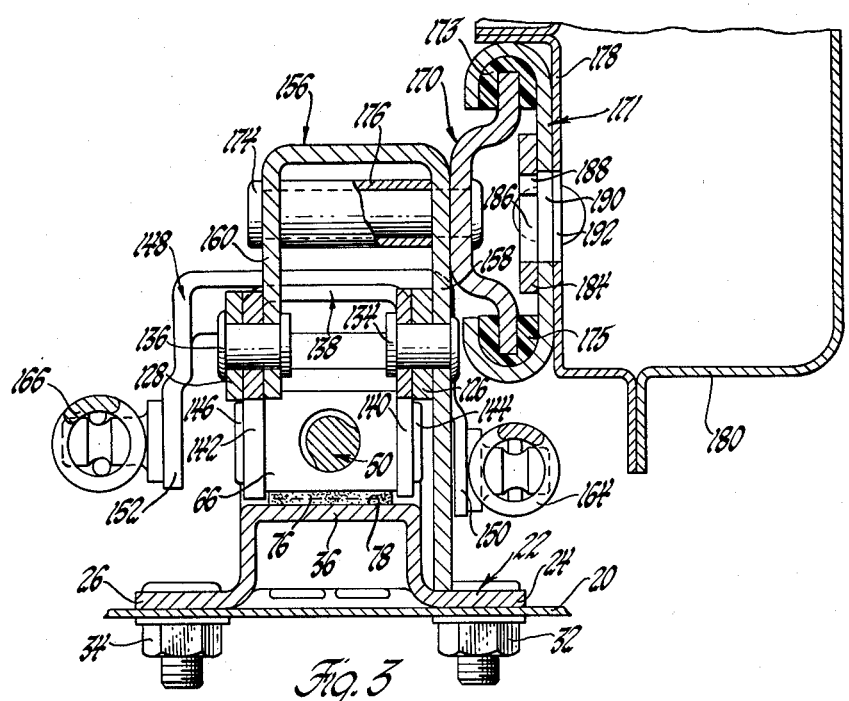
FIGURE 3 is a sectional view taken along the line 3—3 in FIGURE 1.
Figure 4:
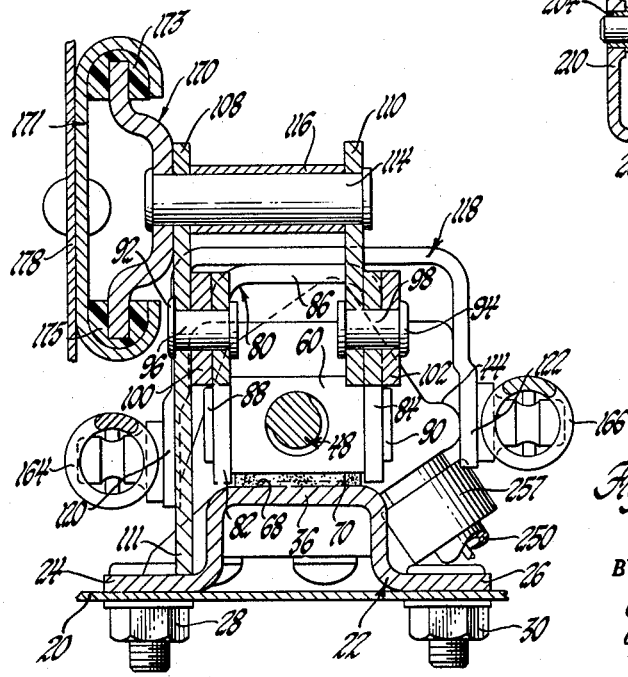
FIGURE 4 is a sectional view taken along the line 4—4 in FIGURE 1.

As shown in FIGURES 1, 3 and 4, each adjuster unit comprises a lower support plate 22 having outwardly extending flanges 24, 26 through which bolt means 28, 30 and 32, 34 secure the adjuster units to the vehicle floor. The bracket 22 has an upwardly extending central portion 36 which terminates at the forward and rearward ends of the bracket in downwardly spaced abutment surfaces 38, 40 for a purpose to be hereinafter described. An additional abutment surface 42 is centrally located on the support bracket. Conventional gear boxes 44, 46 are fixedly secured on the abutment surfaces 38, 42, respectively, in any suitable manner. Each gear box contains conventional drive gear means (not shown). A jack screw 48 extends between the gear housings 44, 46 and is rotatably supported thereby. A jack screw 50 extends between the gear housing 42 and a support bracket 51 mounted on the abutment surface 40 and is rotatably supported therebetween. The gear means in the gear box 44 are drivingly associated with the jack screw 48 and the gear means in the gear box 46 are drivingly associated with the jack screw 50. The forward halves 52, 54 of each of the jack screws are provided with similar threaded means. The rearward halves 56, 58 of the jack screws are also provided with similar threaded means which are oppositely directed from the threaded means on the jack screw portions 52, 54. Nut members 60, 62 are movably mounted on the opposite halves of the jack screw 48 and movable nut members 64, 66 are movably mounted on the opposite halves of the jack screw 50. The nut members 60, 62 are slidably supported on the top surface 68 of the support bracket 22 by suitable bearing members 70, 72, such as plastic bearing plates of nylon, which are secured to the nut members 60, 62. Similar bearing plates 74, 76 support the nut members 64, 66 on the top surface 78 of the rear raised portion of the support bracket 22. In this manner, vertically directed forces imposed on said nut members are transferred through the bearing members to the support bracket.

U-shaped link 80, having spaced leg portions 82, 84 and an interconnecting web portion 86, is pivoted at 88, 90 to the nut unit 60 and at 92, 94 to pin members 96, 98, as shown in FIGURES 1, 2 and 4. A pair of links 100, 102 are pivoted at their upper ends to the pins 96, 98 and at their lower ends to the nut unit 62 at 104. The legs 82, 84 of link 80 and links 100, 102 are secured to vertically extending plates 108, 110 by the pin members 96, 98. The plates 108, 110 are rigidly secured at their upper ends by pin element 114 and a bushing 116. The lower end 111 of plate 108 forms a stop for the linkage in the lowermost vertical adjustment position as shown. A U-shaped control spring plate 118 is welded or otherwise secured to the web 86 of the link 80 and has spring fastening arms 120, 122 extending downwardly on each side of the adjuster unit.

Referring now particularly to FIGURES 1 and 3, a pair of links 126, 128 are pivotally secured at their forward ends at 130 to the nut unit 64 and are pivotally secured at their rearward ends at 132 to pin elements 134, 136. A rear link 138, which is similar in configuration to the front link 80, has side portions 140, 142 pivoted at 144, 146 to the rear nut unit 66. A U-shaped control spring bracket 148 is fastened to the link 138 and provided with downwardly extending spring connecting arm portions 150, 152. The legs 140, 142 of the link 138 and the links 126, 128 are secured by the pins 134, 136 to a U-shaped bracket 156 through downwardly extending side portions 158, 160 thereof. Spring elements 164 and 166 are connected between the spring fastening arms 120, 150 and 122, 152, respectively. The springs 164, 166 are provided to assist vertical upward movement of the front and rear linkage assemblies.

It is emphasized, these spring elements 164, 166 exert the maximum amount of force when the mechanical advantage of the linkages made up by the members 80, 100, 102 and 138, 126, 128, respectively, are smallest. It will be noted, the applicable force exerted by spring elements 164, 166 decreases as the mechanical advantage of the linkages increases, thus providing a more uniform counterbalancing effect than has heretofore been obtained. With more uniform counterbalancing, a series motor rather than a shunt motor may be used to power the mechanism. The use of a series motor results in a substantial cost saving and the noise made thereby is less objectionable from an operator's standpoint.

Figure 5:
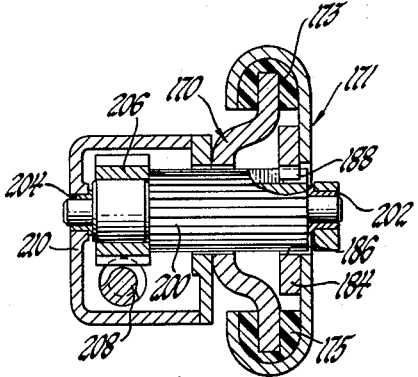
FIGURE 5 is a sectional view of a portion of the apparatus taken along the line 5—5 in FIGURE 1.

As illustrated in FIGURES 3, 4 and 5, a fore and aft adjustment channel member 170 is rigidly secured to and supported by the plates 108, 110 and the pin 114 at its forward end. The channel 170 is rigidly secured at its rearward end to the bracket 156 by spaced pin members 172, 174. As shown in FIGURE 3, each of the pin elements 172, 174 are fixed within a bushing 176 extending between the sides 158, 160 of the bracket 156. The inner channel member 170 slidably supports an outer channel member 171 in a conventional manner on bearing pads 173, 175 of nylon or the like. The channel member 171 is securely fastened in any suitable manner to a side flange 178 of a suport bracket 180 which is fixedly secured to the seat frame 14. A rack plate 184 is fixedly secured to the channel member 171 and is provided with an elongated slot 186 having rack teeth 188 formed along the upper edge thereof. Slots 190, 192, dimensionally corresponding to the slot 186, are formed in the channel member 171 and the flange 178, respectively. An elongated pinion element 200, as shown in FIGURE 5, is rotatably supported in driving engagement with the rack teeth 188 by support bearings 202, 204. A drive gear 206 and a drive worm 208 are drivingly connected to the pinion 200 in a housing 210 which is fixedly secured to the channel member 170 by welding or any other suitable means.

Referring now to FIGURES 1 and 2, the drive mechanism for the adjuster units comprises a conventional reversible electric motor 240 having a driveshaft 242 connected to a conventional transmission unit 244. The motor and transmission are mounted beneath the vehicle floor 20 on a bracket 246 which is securely fastened to an adjacent portion 248 of the vehicle frame. The adjuster units are connected to the transmission 244 by flexible cables 250, 252 and 254. The cables extend beneath the vehicle floor 20 to points closely adjacent the adjuster units whereat they pass upwardly through ports 256, 258 and 260 provided in the vehicle floor adjacent to the drive mechanism with which they are to be connected. The cable 250 is connected to a drive worm 257 in the gear housing 44, the cable 252 is connected to the drive worm 208 in the gear housing 210 and the cable 254 is connected to a drive work 255 in the gear housing 46. A conventional seat adjuster control switch 270 is mounted on the side of the vehicle seat adjacent the vehicle driver and is adapted to permit individual actuation of each of the flexible cables 250, 252, 254 in a conventional manner.

In operation, fore and aft adjustment of the seat 10 is obtained by energization of the motor 240 and clutching engagement of the flexible cable 252 to the driveshaft 242 through the transmission 244. Rotation of the flexible cable 252 drives the worm 208, the gear 206 and the pinion 200. The teeth on the pinion 200 engage the rack teeth 188 along the slot 186 in the rack plate 184. In this manner the pinion 200 drives the rack element 184 forwardly or rearwardly and causes similar movement of the channel member 171 and the seat unit. Vertical adjustment is attained at the front of the vehicle seat by actuation of the flexible cable 250 to drive the worm 257 and a gear mounted in the gear box 44. The gear in the gear box is drivingly connected to the screw jack 48 and causes rotation thereof. Rotation in one direction of the screw jack 48 causes the gear nut units 60, 62 to be moved toward one another on the reversely threaded portions 52, 56 of the jack screw. Actuation of the jack screw in the opposite direction causes the gear nut units to move away from one another in a similar manner. The gear nut units 60, 62 are slidably supported by the bearing pads 70, 72 on the support bracket 22 at all times. When the nut units are moved toward one another the front and rear link members, pivotally attached thereto, move upwardly and force the pin elements 94, 95 upwardly. The plates 108, 110 are thereby moved upwardly and carried by the horizontal adjustment channels 170, 171 and the seat therewith. The seat is thereby tilted about the rear vertical adjustment linkage. When the gear nut units 60, 62 are moved away from one another the control links move downwardly and carry the seat downwardly.

Actuation of the flexible cable 254 drives a worm 255 and worm gear in the gear housing 46 to cause rotation of the screw jack 50. Rotation of the screw jack moves the gear nut units 64, 66 toward or away from one another, depending on the direction of rotation, to cause vertical adjustment at the rear of the seat unit through the associated pivotal linkage in the manner hereinbefore described.

The scope of this invention, as defined by the appended claims, is intended to cover all obvious modifications and variations in the details of construction and the arrangement of the parts, except insofar as limited by the prior art.

The invention claimed is:

1. In combination with seat adjuster apparatus in the form of spaced adjuster units adapted to support a vehicle seat for horizontal adjustment relative to a vehicle floor and comprising: support bracket means fixed relative to the vehicle floor, a seat frame for said vehicle seat, a downwardly extending vertical flange depending from said seat frame and extending fore and aft of said seat, an outwardly extending horizontal flange provided adjacent the upper end of said vertically extending flange, a horizontally extending outer channel member having reversely bent side portions interconnected by a web portion, the outer surface of said web portion being abuttingly secured to and supported against said downwardly extending flange of said seat frame, one of said reversely bent side portions being abuttingly secured to and supported against said outwardly extending flange, horizontally extending rack means associated with said web portion, horizontally extending slot means formed in said web portion and said downwardly extending flange and extending parallel to said rack means, a horizontally extending inner channel member slidably supported within said outer channel member, said inner channel member being connected and supported by said support bracket means, a drive housing fixed to said inner channel member, pinion means rotatably supported in said housing, a port extending through said housing and said inner channel, said pinion means extending through said port and said slot means and being drivingly engaged with said rack means whereby rotation of said pinion means causes sliding movement of said outer channel and said seat fore and aft relative to said inner channel and said vehicle floor.

2. Seat adjuster apparatus in the form of spaced adjuster units adapted to provide fore and aft and vertical adjustment for a vehicle seat, each adjuster unit comprising: means for imparting fore and aft movement to said vehicle seat, an adjuster unit support plate fixedly secured to the vehicle floor, a gear housing containing drive gear means fixedly secured to one end of said plate, a second gear housing containing drive gear means being fixed to said plate on an intermediate portion thereof, shaft bearing means fixed to the other end of said plate, a first jack screw means rotatably supported by and extending between said first gear housing means and said second gear housing means, said first jack screw means being drivingly engaged with said drive gear means in said first gear housing means, a second jack screw means rotatably supported by and extending between said second gear housing means and said shaft bearing means, drive gear means in said second housing means being drivingly associated with said second jack screw means, each of said jack screw means comprising front and rear oppositely threaded portions, movable nut means engageably mounted on each of said portions of said jack screw means and adapted for axial movement along said jack screws by rotation thereof, said nut means on each of said jack screws being movable toward one another when said jack screw means is rotated in one direction and movable away from one another when said jack screw means is rotated in the other direction, pivotal linkage means connecting said nut means on each of said jack screws, said means for imparting fore and aft movement of said seat being connected to and suported by said pivotal linkage whereby said seat may be horizontally adjusted fore and aft in any position of vertical adjustment of said linkage means, said means for imparting fore and aft movement to said seat comprises an outer track channel having inwardly bent side portions connected by a web portion, said web portion being fixedly secured to said frame in a vertically extending attitude, an inner track channel slidably mounted within said outer track channel and having a central web portion, said web portion being supported in a vertical attitude and being connected and supported by said vertical linkage means, rack means provided on said outer track channel, and gear means fixed to said inner track channel and drivingly connected to said rack means on said outer track channel for fore and aft displacement of said outer track channel relative to said inner track channel to horizontally adjust said seat.

3. The apparatus as defined in claim 2 and wherein motor means for driving said drive gear means in said gear housings and said gear means engaged with said rack means is fixedly secured beneath said vehicle floor, flexible cable means extending from said power means beneath said vehicle floor to positions closely adjacent said adjuster units, port means provided in said vehicle floor closely adjacent each of said gear housings, said flexible cables extending upwardly through said ports and being drivingly connected to said drive gear means in said gear housings, and additional cable means extending from said power means to said gear means through a cable port horizontally displaced from said gear means and located closely adjacent said support plate whereby the portion of said cable extending from said cable port to said gear means is moved in a pivotal manner about the portion extending through said port as said vertical adjustment means imparts vertical adjustment to said seat.

References Cited in the file of this patent

UNITED STATES PATENTS

| | | |
|---|---|---|
| 2,242,247 | Grant | May 20, 1941 |
| 2,886,094 | Pickles | May 12, 1959 |
| 2,919,744 | Tanaka | Jan. 5, 1960 |
| 2,924,265 | Himka | Feb. 9, 1960 |
| 2,929,439 | Tanaka | Mar. 22, 1960 |

FOREIGN PATENTS

| | | |
|---|---|---|
| 15,730 | Great Britain | Aug. 21, 1895 |
| 537,098 | Great Britain | June 9, 1941 |
| 886,947 | France | July 26, 1943 |